(12) United States Patent
Hyoudou

(10) Patent No.: US 10,944,677 B2
(45) Date of Patent: Mar. 9, 2021

(54) INFORMATION PROCESSING APPARATUS AND INFORMATION PROCESSING SYSTEM

(71) Applicant: FUJITSU LIMITED, Kawasaki (JP)

(72) Inventor: Kazuki Hyoudou, Chofu (JP)

(73) Assignee: FUJITSU LIMITED, Kawasaki (JP)

( * ) Notice: Subject to any disclaimer, the term of this patent is extended or adjusted under 35 U.S.C. 154(b) by 16 days.

(21) Appl. No.: 16/275,390

(22) Filed: Feb. 14, 2019

(65) Prior Publication Data
US 2019/0280980 A1 Sep. 12, 2019

(30) Foreign Application Priority Data

Mar. 8, 2018 (JP) .............................. JP2018-042242

(51) Int. Cl.
| | | |
|---|---|---|
| H04L 12/803 | (2013.01) | |
| H04L 12/933 | (2013.01) | |
| H04L 12/935 | (2013.01) | |
| H04L 12/931 | (2013.01) | |

(52) U.S. Cl.
CPC .......... *H04L 47/125* (2013.01); *H04L 49/101* (2013.01); *H04L 49/30* (2013.01); *H04L 49/70* (2013.01)

(58) Field of Classification Search
CPC ..... H04L 47/125; H04L 49/70; H04L 49/101; H04L 49/30
See application file for complete search history.

(56) References Cited

U.S. PATENT DOCUMENTS

| | | | |
|---|---|---|---|
| 8,639,783 B1 * | 1/2014 | Bakke ...................... | H04L 49/70 709/220 |
| 2004/0139236 A1 * | 7/2004 | Mehra ...................... | H04L 49/70 709/250 |
| 2010/0306387 A1 | 12/2010 | Ajima et al. | |
| 2011/0085568 A1 * | 4/2011 | Gnanasekaran ...... | H04L 45/586 370/419 |
| 2011/0238816 A1 * | 9/2011 | Vohra .................. | H04L 41/0806 709/224 |
| 2011/0299424 A1 * | 12/2011 | Rikitake ............... | H04L 49/354 370/254 |

(Continued)

FOREIGN PATENT DOCUMENTS

| | | |
|---|---|---|
| JP | 2010-183450 | 8/2010 |
| JP | 2017-174301 | 9/2017 |

*Primary Examiner* — Mehmood B. Khan
(74) *Attorney, Agent, or Firm* — Fujitsu Patent Center

(57) ABSTRACT

An information processing apparatus includes a plurality of offload devices each of which offloads and executes a relay process of a virtual switch, each of the plurality of offload devices including a memory that stores port conversion information, the port conversion information associating virtual port identifiers for identifying virtual ports before and after a virtual port to which a virtual machine executed by the information processing apparatus is connected is moved between the offload devices, and a processor coupled to the memory and that converts an input virtual port identifier for identifying an input virtual port into which a packet is input based on the port conversion information, searches an output virtual port identifier for identifying an output virtual port of the packet by using the converted input virtual port identifier, and converts the searched output virtual port identifier based on the port conversion information.

6 Claims, 16 Drawing Sheets

(56) References Cited

U.S. PATENT DOCUMENTS

| | | | |
|---|---|---|---|
| 2014/0226523 A1* | 8/2014 | Deshpande | H04L 41/0816 370/254 |
| 2016/0087872 A1* | 3/2016 | Park | H04L 45/02 709/223 |
| 2016/0224363 A1* | 8/2016 | Joy | G06F 9/45558 |
| 2017/0052916 A1* | 2/2017 | Kollu | G06F 13/4282 |
| 2018/0359215 A1* | 12/2018 | Khare | H04L 61/6022 |
| 2019/0273718 A1* | 9/2019 | Ahuja | H04L 63/0236 |

\* cited by examiner

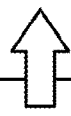

FIG. 3A

BEFORE RECONNECTION

NIC#1

INPUT PORT CONVERSION TABLE

| BEFORE CONVERSION | AFTER CONVERSION |
|---|---|
| 1 | 1 |
| 2 | 2 |
| 3 | 3 |

OUTPUT PORT CONVERSION TABLE

| BEFORE CONVERSION | AFTER CONVERSION |
|---|---|
| 1 | 1 |
| 2 | 2 |
| 3 | 3 |
| 11 | 11 |
| 12 | 12 |
| 13 | 13 |

DMA MEMORY INFORMATION

| PID | TXQ INFORMATION | RXQ INFORMATION | MAP INFORMATION |
|---|---|---|---|
| 1 | INFORMATION OF VM #1 | n/a | |
| 2 | | | |

NIC#2

INPUT PORT CONVERSION TABLE

| BEFORE CONVERSION | AFTER CONVERSION |
|---|---|
| 11 | 11 |
| 12 | 12 |
| 13 | 13 |

OUTPUT PORT CONVERSION TABLE

| BEFORE CONVERSION | AFTER CONVERSION |
|---|---|
| 1 | 1 |
| 2 | 2 |
| 3 | 3 |
| 11 | 11 |
| 12 | 12 |
| 13 | 13 |

DMA MEMORY INFORMATION

| PID | TXQ INFORMATION | RXQ INFORMATION | MAP INFORMATION |
|---|---|---|---|
| 11 | INFORMATION OF VM #2 | n/a | |
| 12 | | | |

FIG. 3B

BEFORE RECONNECTION

NIC#1

INPUT PORT CONVERSION TABLE

| BEFORE CONVERSION | AFTER CONVERSION |
|---|---|
| 1 | 1 |
| 2 | 12 |
| 3 | 3 |

OUTPUT PORT CONVERSION TABLE

| BEFORE CONVERSION | AFTER CONVERSION |
|---|---|
| 1 | 1 |
| 2 | 12 |
| 3 | 3 |
| 11 | 11 |
| 12 | 2 |
| 13 | 13 |

DMA MEMORY INFORMATION

| PID | TXQ INFORMATION | RXQ INFORMATION | MAP INFORMATION |
|---|---|---|---|
| 1 | | | INFORMATION OF VM #1 |
| 2 | | | INFORMATION OF VM #2 |

NIC#2

INPUT PORT CONVERSION TABLE

| BEFORE CONVERSION | AFTER CONVERSION |
|---|---|
| 11 | 11 |
| 12 | 2 |
| 13 | 13 |

OUTPUT PORT CONVERSION TABLE

| BEFORE CONVERSION | AFTER CONVERSION |
|---|---|
| 1 | 1 |
| 2 | 12 |
| 3 | 3 |
| 11 | 11 |
| 12 | 2 |
| 13 | 13 |

DMA MEMORY INFORMATION

| PID | TXQ INFORMATION | RXQ INFORMATION | MAP INFORMATION |
|---|---|---|---|
| 11 | | n/a | |
| 12 | | n/a | |

INFORMATION PROCESSING APPARATUS AND INFORMATION PROCESSING SYSTEM

CROSS-REFERENCE TO RELATED APPLICATION

This application is based upon and claims the benefit of priority of the prior Japanese Patent Application No. 2018-042242, filed on Mar. 8, 2018, the entire contents of which are incorporated herein by reference.

FIELD

The embodiments discussed herein are related to an information processing apparatus and an information processing system.

BACKGROUND

The use of the network function virtualization (NFV) has been increasing recently. The NFV is a technique for mounting network functions that have been implemented in a dedicated apparatus of the related art, by software on a general purpose information processing apparatus. The NFV operates a plurality of virtual network functions (VNF) in a single information processing apparatus by using a virtualization technique of the information processing apparatus, and connects the VNFs to each other or connects an external network (NW) and the VNF to each other by, for example, a virtual switch.

However, since the virtual switch implemented by software has a large processing delay and a large processing time variation, it is difficult to satisfy the performance required for the NFV. In addition, the virtual switch implemented by software requires a large amount of central proceeding unit (CPU) capability for relaying packets, and thus wastes the CPU to be provided to an application.

Therefore, the relay function of the virtual switch is offloaded to, for example, a field programmable gate array (FPGA)-network interface card (NIC) or a smart NIC. Here, the NIC is a communication apparatus. Further, the FPGA-NIC is an NIC equipped with an FPGA, and implements the relay function of the virtual switch by the FPGA. In addition, the smart NIC is a programmable NIC and implements the relay function of the virtual switch by a program.

FIGS. 12A and 12B are diagrams for describing the offload of the virtual switch. In FIGS. 12A and 12B, virtual machines (VM) 5 represented by a VM #1 and a VM #2 is a virtual machine. Each VM 5 includes a vnic 5a. The vnic 5a is a virtual NIC. FIG. 12A illustrates a case where a relay circuit 62 of a virtual switch 6 is not offloaded, and FIG. 12B illustrates a case where the relay circuit 62 of the virtual switch 6 is offloaded to a NIC 9.

As illustrated in FIG. 12A, the virtual switch 6 includes a control circuit 61 and a relay circuit 62. The control circuit 61 controls the virtual switch 6. The relay circuit 62 relays packets transferred between the VMs 5. The relay circuit 62 has four vports 64. The vports 64 are virtual ports. In the relay circuit 62, the number of vports 64 may not be four but may be other than four.

The vnics 5a are connected to the vports 64. The other two vports 64 which are not connected to the vnics 5a are connected to physical ports 77 of two NICs 7 represented by a NIC #71 and a NIC #72, respectively. The VM 5 communicates with the VM 5 that operates on another information processing apparatus, via the virtual switch 6 and the NICs 7.

As illustrated in FIG. 12B, each NIC 9 includes an offloaded offload relay circuit 96. The offload relay circuit 96 includes two vports 94. One vport 94 is connected to the vnic 5a, and the other vport 94 is connected to a physical port 97.

The relay circuit 62 of the virtual switch 6 is offloaded to the two NICs 9 represented by a NIC #91 and a NIC #92, and as a result, the function of the control circuit 61 is changed. A virtual switch control circuit 81 is the control circuit 61 after the change. When the relay circuit 62 of the virtual switch 6 is offloaded to the plurality of NICs 9, a mechanism and a control in which the plurality of NICs 9 cooperatively operate are required in order to manage the NICs 9 as one relay circuit 62.

There is a related art in which setting information regarding setting of hardware offload functions of the plurality of NICs is acquired from a plurality of hypervisors and a hypervisor in which the VM is disposed is selected based on the setting information, and as a result, the VM is disposed by considering the setting of a hardware offload function.

There is a related art in which the NIC identifies a connection of communication with a port number to manage a connection state for each port by a port context installed in a main memory, and the port context is managed by a port table installed in the main memory. According to the related art, establishment and cutting processes of communication connection are offloaded to the NIC to perform the management of the communication connection in the main memory, and as a result, the load of a communication process of a processor may be reduced and the number of communication connections which are maintainable may be increased further.

Related techniques are disclosed in, for example, Japanese Laid-open Patent Publication Nos. 2017-174301 and 2010-183450.

SUMMARY

According to an aspect of the embodiments, an information processing apparatus includes a plurality of offload devices each of which offloads and executes a relay process of a virtual switch, each of the plurality of offload devices including a memory that stores port conversion information, the port conversion information associating virtual port identifiers for identifying virtual ports before and after a virtual port to which a virtual machine executed by the information processing apparatus is connected is moved between the offload devices, and a processor coupled to the memory and that converts an input virtual port identifier for identifying an input virtual port into which a packet is input based on the port conversion information, searches an output virtual port identifier for identifying an output virtual port of the packet by using the converted input virtual port identifier, and converts the searched output virtual port identifier based on the port conversion information.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIGS. 3A and 3B are views illustrating an example of an exchange of a virtual port;

DESCRIPTION OF EMBODIMENTS

Figure 12B:
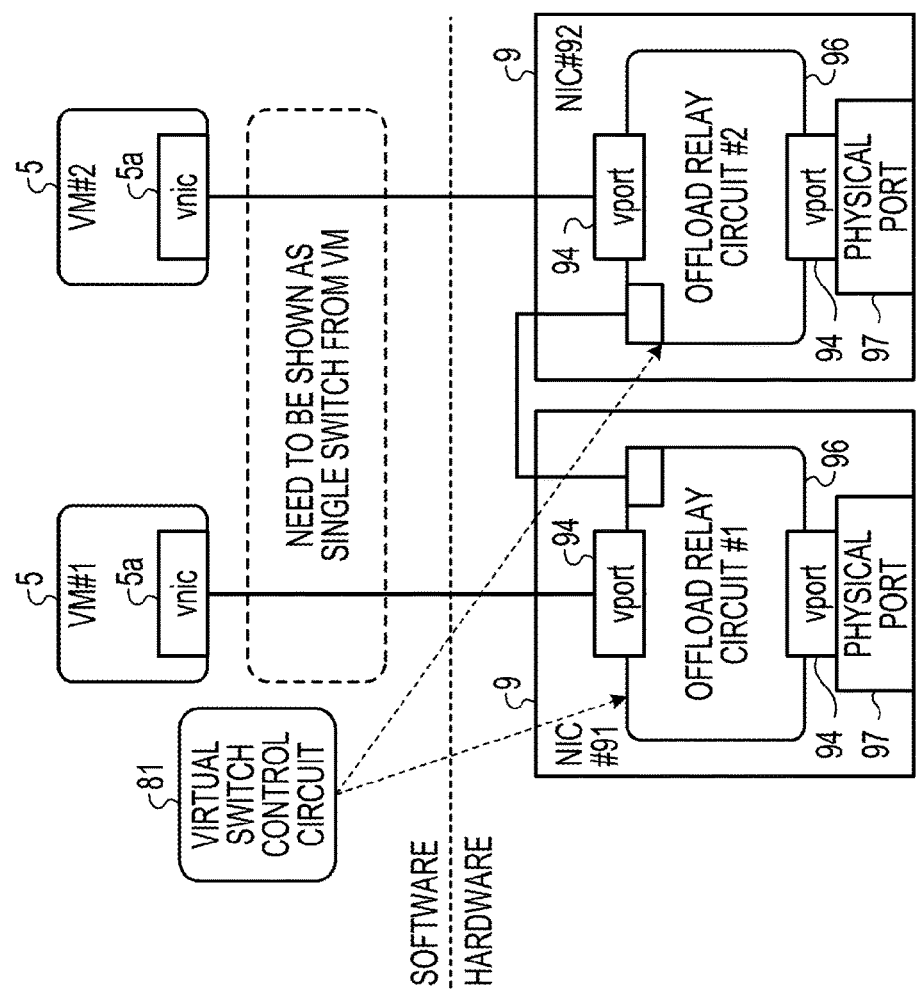
FIGS. 12A and 12B are diagrams for describing offload of a virtual switch.
Figure 12A:
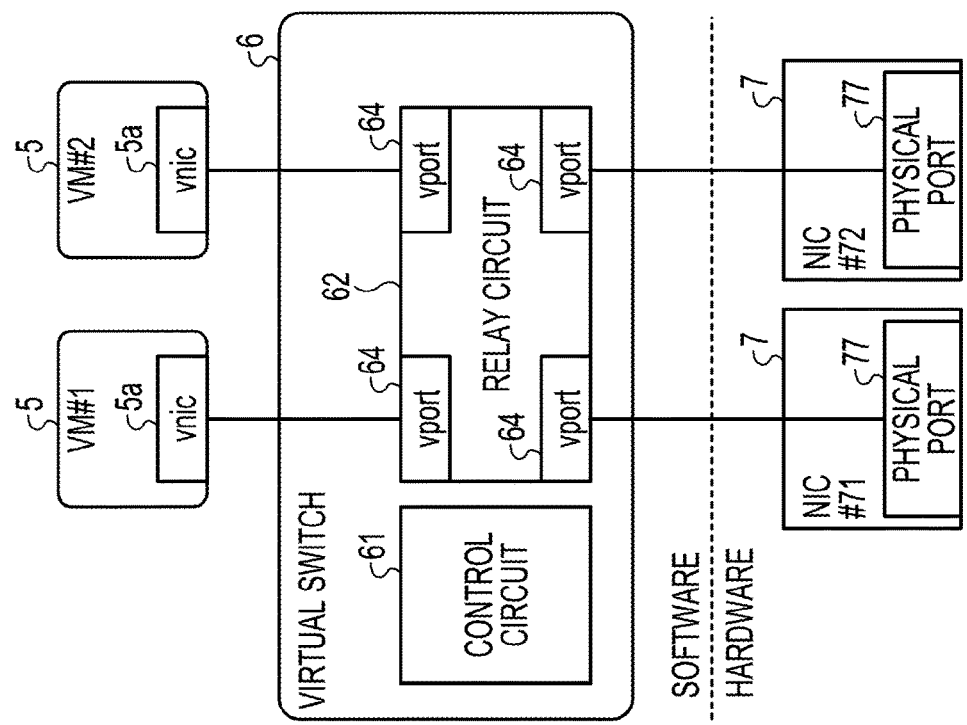
Figure 13:
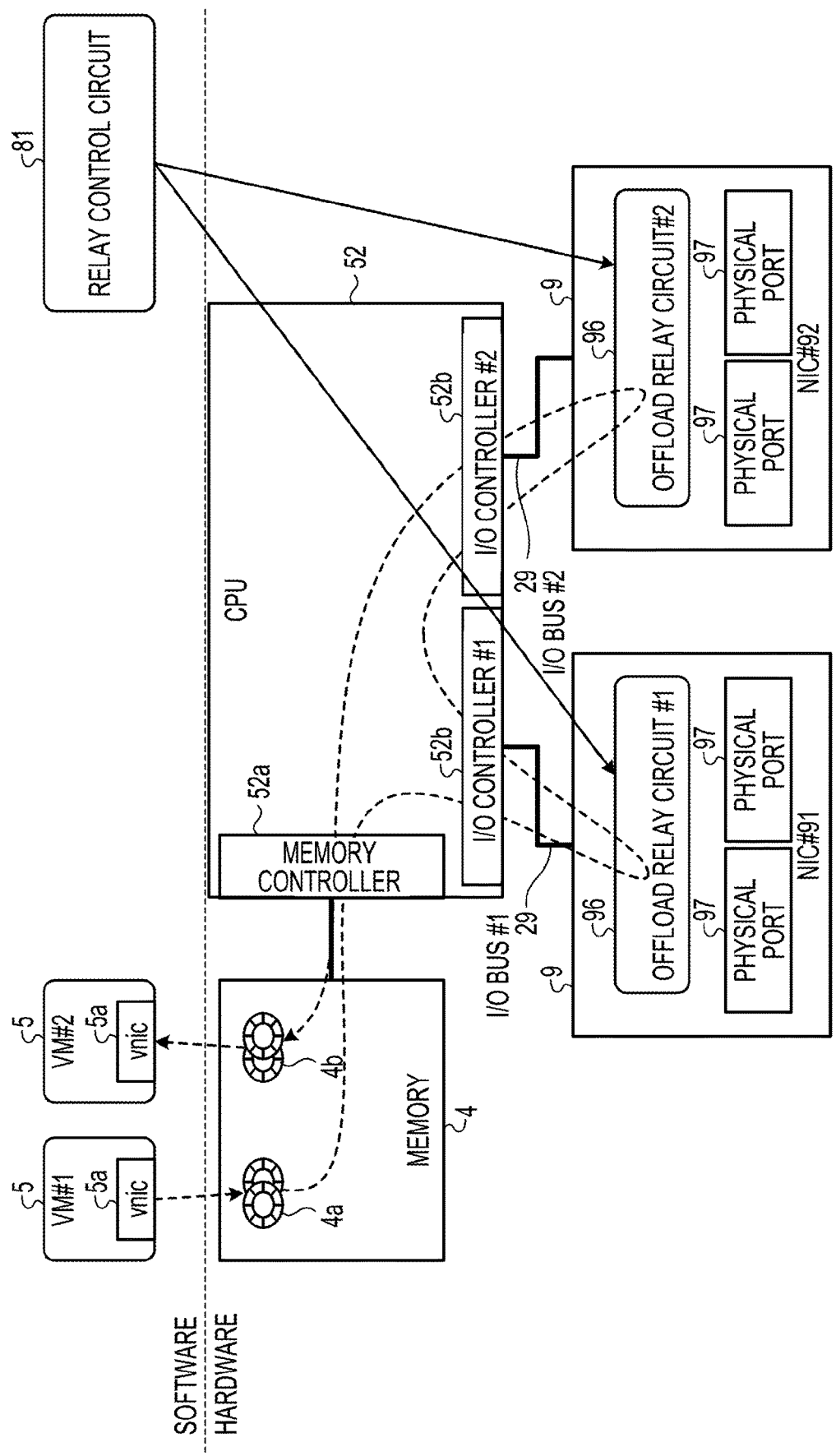
FIG. 13 is a diagram for describing waste of an I/O bus band by return of an I/O bus.

When the virtual switch 6 is offloaded as illustrated in FIGS. 12A and 12B so that the plurality of offload relay circuits 96 are cooperatively operated, there is a problem that waste of an I/O bus band occurs due to a return of an I/O bus. FIG. 13 is a diagram for describing the waste of the I/O bus band by the return of the I/O bus. FIG. 13 illustrates a case where the VM #1 transfers data to the VM #2. The vnic 5a of the VM #1 is connected to an offload relay circuit #1, and the vnic 5a of the VM #2 is connected to an offload relay circuit #2.

As illustrated in FIG. 13, a CPU 52 includes a memory controller 52a and I/O controllers 52b represented by an I/O controller #1 and an I/O controller #2. The VM #1 executed by the CPU 52 writes the data to be transmitted, to a ring buffer 4a of a memory 4. The data written to the ring buffer 4a is read by the offload relay circuit #1 via the memory controller 52a and the I/O controller #1 of the CPU 52, and an I/O bus #1.

The offload relay circuit #1 transfers the data to the offload relay circuit #2 via the I/O bus #1, the I/O controller #1, the I/O controller #2, and an I/O bus #2. Then, the offload relay circuit #2 writes the data to a ring buffer 4b via the I/O bus #2, the I/O controller #2, and the memory controller 52a. Then, the VM #2 executed by the CPU 52 reads the data from the ring buffer 4b.

As described above, in the communication between the VMs 5 connected to the different NICs 9, a plurality of returns occurs on the I/O bus 29, and as a result, a valuable I/O bus band is wasted. Further, in the communication between the VMs 5 connected to the different NICs 9, the throughput is reduced.

Hereinafter, embodiments of an information processing apparatus, an information processing system, and a program according to the present disclosure will be described in detail with reference to the accompanying drawings. Further, the embodiments do not limit the present disclosure.

EMBODIMENTS

Figure 1:
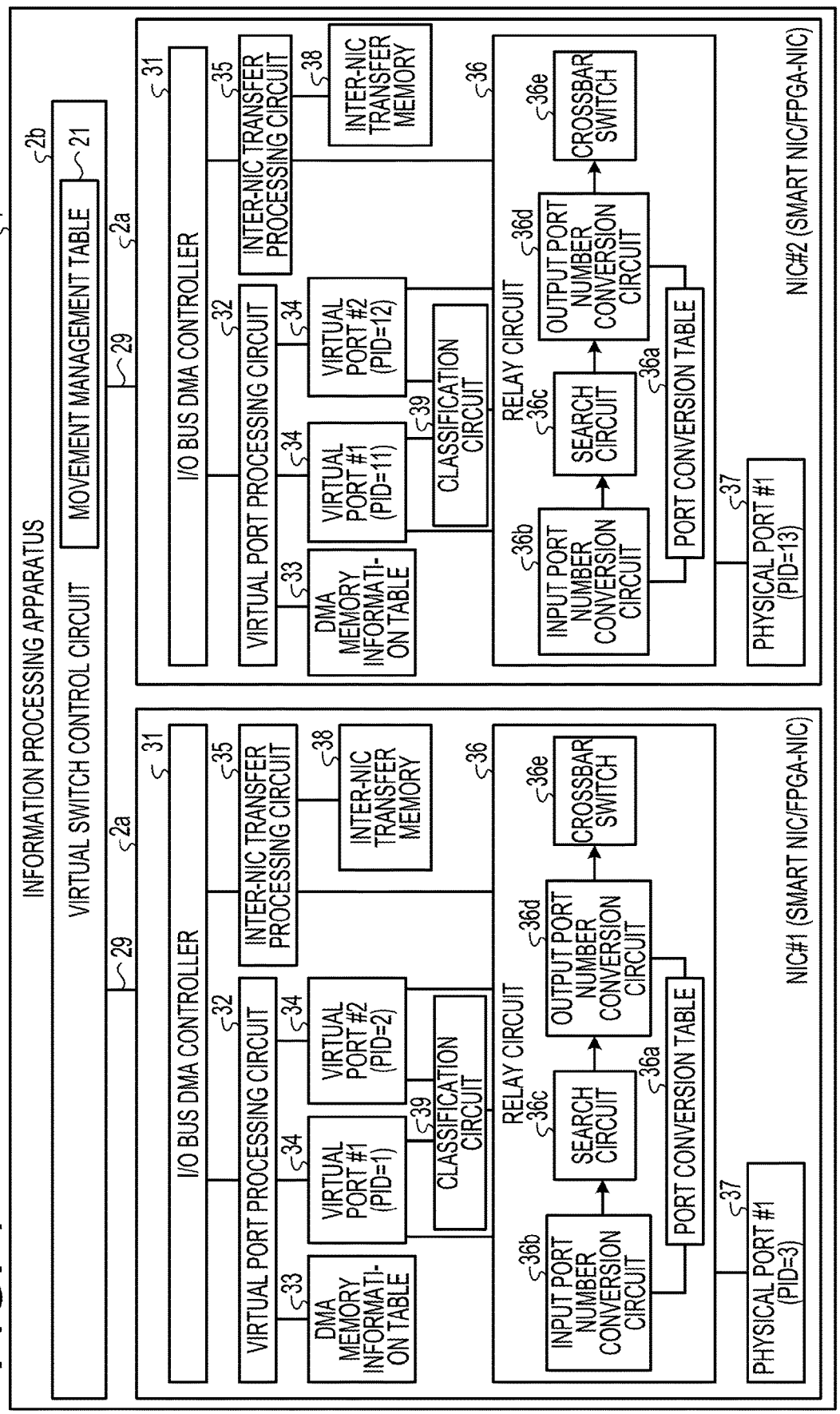
FIG. 1 is a diagram illustrating a configuration of an information processing apparatus according to an embodiment.

First, a configuration of an information processing apparatus according to an embodiment will be described. FIG. 1 is a diagram illustrating a configuration of an information processing apparatus according to an embodiment. As illustrated in FIG. 1, an information processing apparatus 1 according to an embodiment includes two NICs 2a represented by a NIC #1 and a NIC #2 and a virtual switch control circuit 2b. Further, the information processing apparatus 1 may include three or more NICs 2a. In a CPU of the information processing apparatus 1, a virtual machine (VM) 5 operates.

Each NIC 2a is a device that performs a communication and is, for example, a smart NIC or an FPGA-NIC. The virtual switch 6 is offloaded to the NICs 2a. Each NIC 2a includes an I/O bus direct memory access (DMA) controller 31, a virtual port processing circuit 32, a DMA memory information table 33, virtual ports 34 represented by a virtual port #1 and a virtual port #2, and an inter-NIC transfer processing circuit 35. Further, the NIC 2a includes a relay circuit 36, a physical port 37, an inter-NIC transfer memory 38, and a classification circuit 39. The NIC 2a is an example of an offload device.

The I/O bus DMA controller 31 is an I/O bus controller that controls the I/O bus 29, and a DMA controller that controls DMA to a memory region of the VM 5.

The virtual port processing circuit 32 accesses the memory region of the VM 5 via the I/O bus DMA controller 31 by using DMA memory information corresponding to the virtual ports 34 to execute transmission and reception of data. The DMA memory information is information used when DMA is performed to the memory region of the VM 5 corresponding to the virtual port 34. A DMA memory information table 33 is a table that stores the DMA memory information for each virtual port 34.

The virtual port processing circuit 32 assigns metadata having a number of an input virtual port 34 as an element, to a reception packet. In addition, the virtual port processing circuit 32 deletes the metadata at the time of transmitting the packet.

The virtual ports 34 are virtual ports that are used for the communication with the VM 5. Port identifiers (PIDs) of the two virtual ports 34 of the NIC #1 are 1 and 2, respectively, and PIDs of the two virtual ports 34 of the NIC #2 are 11 and 12, respectively. Here, the PID is a number for identifying each virtual port 34.

The PID is set in each virtual port 34 so as to be unique within the information processing apparatus even when the information processing apparatus 1 includes the plurality of NICs 2a. In FIG. 1, a digit of 10 of the PID is set as NIC-ID (ID of NIC 2a), and a digit of 1 is set to a port ID in the NIC. The NIC-ID of NIC #1 is 1 and the NIC-ID of NIC #2 is 2.

Figure 2:
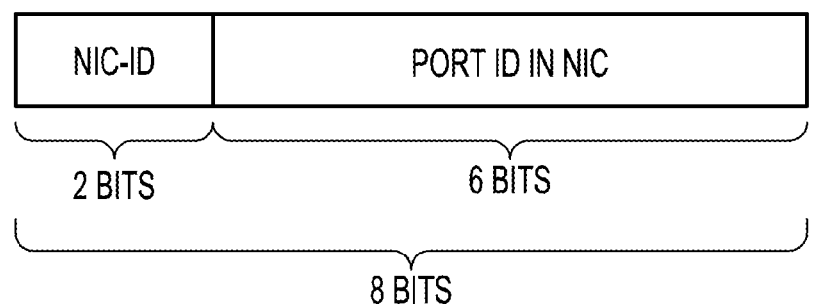
FIG. 2 is a diagram illustrating an example of another PID.

FIG. 2 is a diagram illustrating an example of another PID. In FIG. 2, upper 2 bits of 8-bit PID indicate the NIC-ID, and lower 6 bits indicate the port ID in the NIC 2a. In the example, it is uniquely identified that 64 ports×4 NIC=256 ports. Further, by setting a part of the PID as the NIC-ID for identifying the NIC 2a, the relay circuit 36 of each NIC 2a may determine the NIC 2a corresponding to a reception destination port.

The inter-NIC transfer processing circuit 35 executes packet transmission/reception with another NIC 2a via the I/O bus DMA controller 31. The relay circuit 36 is an offload relay circuit to which the relay function of the virtual switch 6 is offloaded. The relay circuit 36 searches for an action corresponding to input packet information (including an output to the reception destination port), and executes the action.

The physical port 37 is a port used for a communication with the outside. The inter-NIC transfer memory 38 stores the number of times of the transfer between the NICs in association with a pair of the input virtual port 34 and the output virtual port 34. The classification circuit 39 analyzes header information of the reception packet, and adds the header information to the metadata assigned to the reception packet by the virtual port processing circuit 32. The metadata is used in the relay circuit 36.

In the communication between the two VMs operating on the CPU, when the NICs 2*a* which are connection destinations of the two VMs 5 are different from each other and the communication between the VMs is frequently conducted, the information processing apparatus 1 biases the connection destinations of the VMs 5 to one NIC 2*a*. That is, the information processing apparatus 1 moves the virtual ports 34 to which one of the VMs 5 is connected, such that the virtual ports 34 to which the two VMs 5 are connected are biased to the same NIC 2*a*. Alternatively, when there is no empty virtual port 34 in the NIC 2*a* which is a movement destination, the information processing apparatus 1 exchanges the virtual ports 34. The information processing apparatus 1 may prevent the waste of the band of the I/O bus 29 by biasing the connection destinations of the two VMs 5 which communicate with each other, to one NIC 2*a*.

The relay circuit 36 includes a port conversion table 36*a*, an input port number conversion circuit 36*b*, a search circuit 36*c*, an output port number conversion circuit 36*d*, and a crossbar switch 36*e*.

The port conversion table 36*a* stores the PIDs before and after the movement (exchange) of the virtual ports 34. In order to maintain a consistency of a search rule and an output destination of the crossbar switch 36*e* even after a VM reconnection (movement or exchange of the virtual ports 34), the relay circuit 36 performs a conversion of the PIDs before and after the movement (exchange) based on the port conversion table 36*a*.

FIGS. 3A and 3B are views illustrating an example of the exchange of the virtual ports 34. FIGS. 3A and 3B illustrate a case where the virtual port #2 (PID=12) of the NIC #2 is exchanged with the virtual port #2 (PID=2) of the NIC #1. As illustrated in FIGS. 3A and 3B, the port conversion table 36*a* includes an input port conversion table and an output port conversion table. The input port conversion table is used for converting the PID of the input virtual port 34 of the packet. The output port conversion table is used for converting the PID of the output virtual port 34 of the packet.

Before the reconnection of the VM 5, the conversion of the PIDs is not required. Therefore, in both the input port conversion tables and the output port conversion tables of the NIC #1 and the NIC #2, the PIDs before and after conversion are the same. Further, FIGS. 3A and 3B illustrate a case where the NIC #1 and the NIC #2 each have three virtual ports 34.

After the reconnection of the VM 5, PID=2 is converted into PID=12, and PID=12 is converted into PID=2 in both the input port conversion tables and the output port conversion tables of the NIC #1 and the NIC #2.

When the virtual ports 34 are exchanged, the DMA memory information is also exchanged. Before the reconnection of the VM 5, since the virtual port 34 of PID=1 is connected to the VM #1, PID=1 is associated with the information of the VM #1, and since the virtual port 34 of PID=12 is connected to the VM #2, PID=12 is associated with the information of the VM #2. Further, n/a indicates that the virtual port 34 is not connected to the VM 5. In addition, TXQ information is information on a transmission buffer, RXQ information is information on a reception buffer, and map information is information for mapping a virtual memory and a physical memory. After the reconnection of the VM 5, since the virtual port 34 of PID=2 is connected to the VM #2, PID=2 is associated with the information of the VM #2, and PID=12 is associated with n/a.

Referring back to FIG. 1, the input port number conversion circuit 36*b* converts the PID of the input virtual port 34 after the movement (exchange) into the PID of the input virtual port 34 before the movement (exchange) using the input port conversion table, so that the packet may be relayed without changing the search rule when the VM 5 is reconnected.

The search circuit 36*c* searches action information corresponding to the reception packet based on a rule of which setting is completed, and determines the action for the reception packet. In the rule, for example, the PID of the input virtual port 34 and the header information are designated. As the PID of the input virtual port 34, the PID converted by the input port number conversion circuit 36*b* is used.

The output port number conversion circuit 36*d* converts the PID of the output virtual port 34 before the movement (exchange) into the PID of the output virtual port 34 after the movement (exchange) using the output port conversion table, so that the communication may be conducted without changing the search rule when the VM 5 is reconnected.

The crossbar switch 36*e* transfers the packet to the output virtual port 34. As for the PID of the output virtual port 34, the PID converted by the output port number conversion circuit 36*d* is used.

The virtual switch control circuit 2*b* controls the relay circuit 36. Specifically, the virtual switch control circuit 2*b* determines whether to perform the biasing for the pair of the input virtual port 34 and the output virtual port 34. For example, the virtual switch control circuit 2*b* determines whether to perform the biasing based on a state of an unused virtual port 34 and a traffic amount of each NIC 2*a*. Then, when it is determined to perform the biasing, the virtual switch control circuit 2*b* updates the movement management table 21, and sets the port conversion table 36*a* of each NIC 2*a* based on the updated movement management table 21. The movement management table 21 is used for managing the movement (exchange) of the virtual ports 34.

Figure 4A:
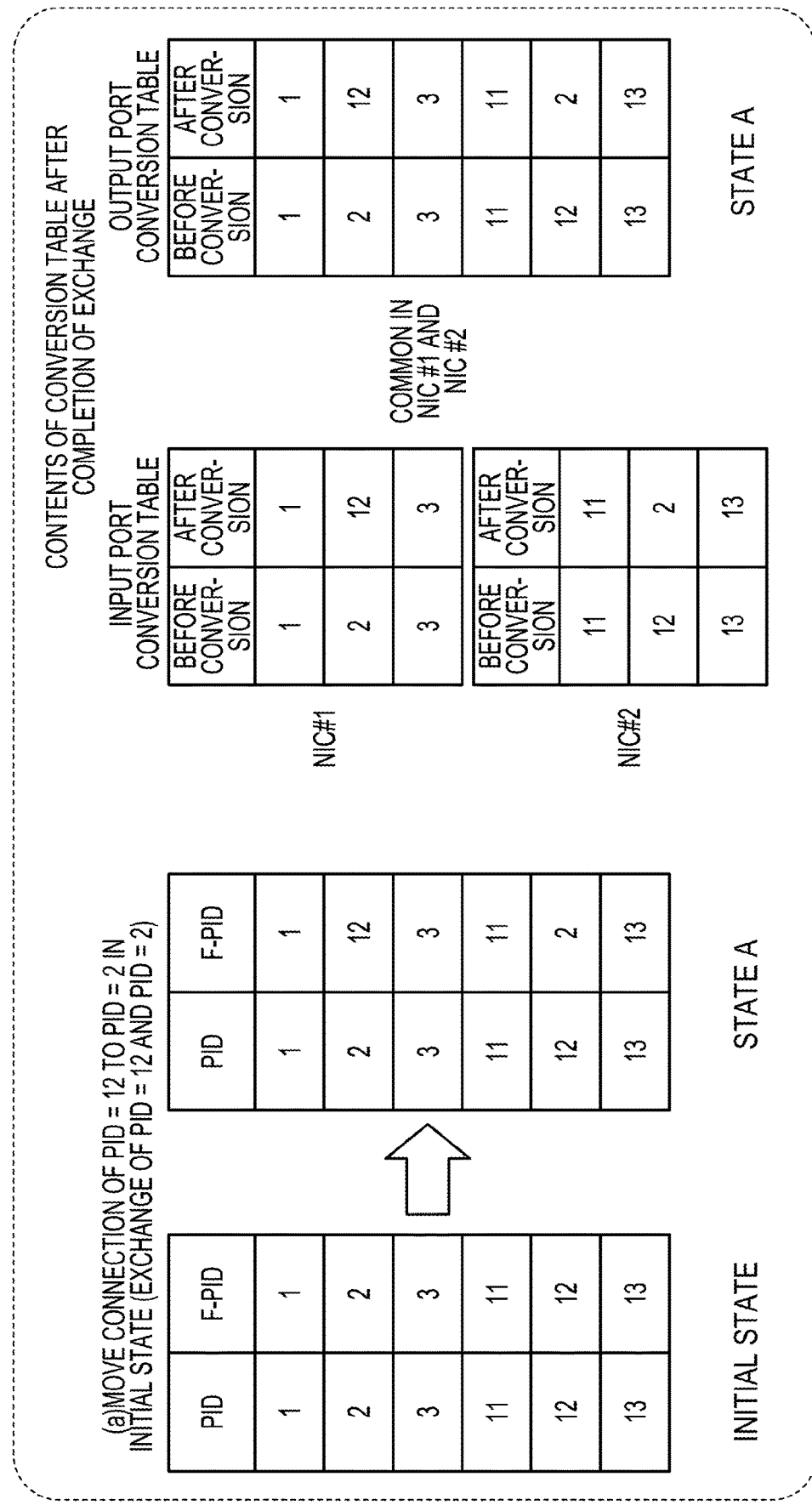
FIGS. 4A and 4B are views illustrating an example of a movement management table.
Figure 4B:

FIGS. 4A and 4B are views illustrating an example of the movement management table 21. As illustrated in FIGS. 4A and 4B, the movement management table 21 associates the PID and floating (F)-PID with each other. While the PID is a number fixedly allocated to a virtual port 34, the F-PID is a PID which is continuously used in, for example, a rule used in the search circuit 36*c* even after the connection movement of the VM 5.

During the connection movement of the VM 5, the virtual switch control circuit 2*b* exchanges F-PIDs of entries corresponding to a movement source PID and a movement destination PID (two exchanged PIDs) of the movement management table 21. The virtual switch control circuit 2*b* sets information for converting the PID into the F-PID in the input port conversion table, and sets information for converting the F-PID into the PID in the output port conversion table. In this way, by using the movement management table 21, even when the movement (exchange) of the PIDs occurs multiple times, the virtual switch control circuit 2b may correctly associate the F-PID used in, for example, the rule of the search circuit 36c and the PID after the movement (exchange) with each other.

In FIGS. 4A and 4B, PID=12 and PID=2 are exchanged, and the F-PIDs of the entries corresponding to PID=2 and PID=12 in the movement management table 21 are exchanged. As a result, the F-PID of the entry corresponding to PID=2 in the movement management table 21 becomes 12, and the F-PID of the entry corresponding to PID=12 in the movement management table 21 becomes 2. In the input port conversion table, the PID after the conversion which corresponds to PID=2 before the conversion is updated to 12, and the PID after the conversion which corresponds to PID=12 before the conversion is updated to 2. In the output port conversion table, the PID after the conversion which corresponds to PID=2 before the conversion is updated to 12, and the PID after the conversion which corresponds to PID=12 before the conversion is updated to 2.

In FIG. 4B, further, PID=1 and PID=12 are exchanged, and the F-PIDs of the entries corresponding to PID=1 and PID=12 in the movement management table 21 are exchanged. As a result, the F-PID of the entry corresponding to PID=1 in the movement management table 21 becomes 2, and the F-PID of the entry corresponding to PID=12 in the movement management table 21 becomes 1. In the input port conversion table, the PID after the conversion which corresponds to PID=1 before the conversion is updated to 2, and the PID after the conversion which corresponds to PID=12 before the conversion is updated to 1. In the output port conversion table, the PID after the conversion which corresponds to PID=2 before the conversion is updated to 1, and the PID after the conversion which corresponds to PID=1 before the conversion is updated to 12.

FIG. 1 illustrates a case where the virtual switch control circuit 2b has the movement management table 21. However, the NIC 2a may have the movement management table 21. In addition, the virtual switch control circuit 2b is implemented by executing a control application to be described later by the CPU of the information processing apparatus 1.

Next, an operation of the information processing apparatus 1 relating to the biasing of the virtual port 34 will be described. The inter-NIC transfer processing circuit 35 detects the inter-NIC transfer and writes the number of times of the transfer for the pair of the input virtual port 34 and the output virtual port 34. Then, the virtual switch control circuit 2b attempts the biasing for a combination of the input virtual port 34 and the output virtual port 34 that exceeds a predetermined frequency (e.g., the number of times/unit time). The virtual switch control circuit 2b determines whether to move the virtual ports and selects the NIC 2a to which the virtual ports are to be biased, according to, for example, a situation of an empty virtual port 34 or a load situation of each NIC 2a.

For example, for the pair of the input virtual port 34 (PID=1) and the output virtual port 34 (PID=12), the connection of the output virtual port 34 (PID=12) is moved to the virtual port 34 of PID=2. Then, the virtual switch control circuit 2b exchanges the DMA memory information of the virtual port #2 (PID=12) of the NIC #2 and the DMA memory information of the virtual port #2 (PID=2) of the NIC #1.

Then, in order to allow the communication to be continued without changing the rule of the search circuit 36c, the virtual switch control circuit 2b sets the information for converting the PID of the virtual port 34 after the connection movement into the PID of the virtual port 34 before the connection movement, in the input port conversion table. Similarly, the virtual switch control circuit 2b sets the information for converting the reception destination PID (the PID of the virtual port 34 before the connection movement) into the PID of the virtual port 34 after the connection movement which is hit by the search circuit 36c, in the output port conversion table.

The packet input from the virtual port 34 after the connection movement by the input port number conversion circuit 36b is treated as the packet input from the virtual port 34 before the connection movement by the search circuit 36c, and an appropriate reception destination is acquired. Further, the reception destination obtained by the application of the action by the output port number conversion circuit 36d is converted into the virtual port number after the connection movement, and the packet is appropriately transferred to the virtual port 34 after the movement by the crossbar switch 36e.

Figure 5:
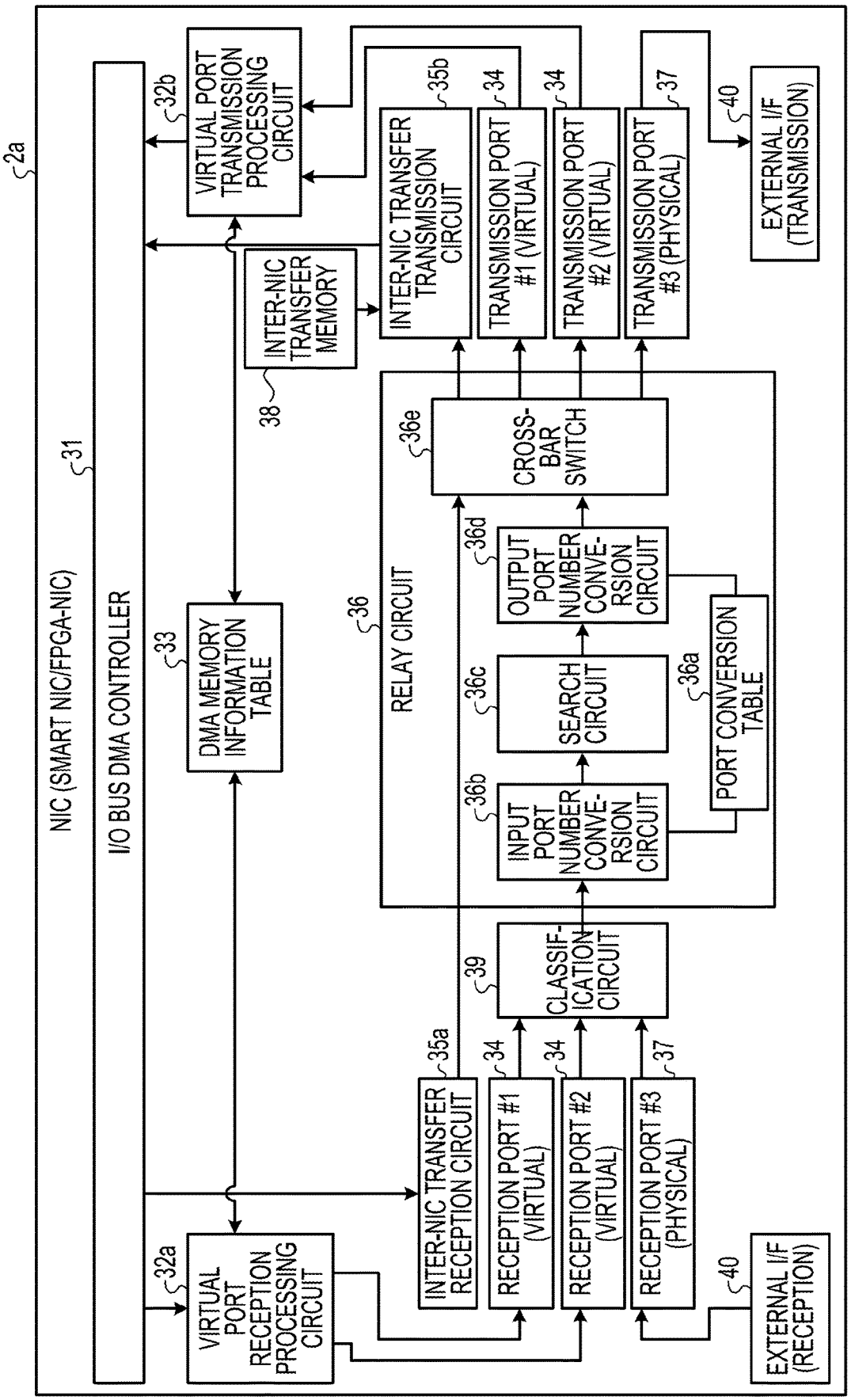
FIG. 5 is a diagram for describing skipping of a search circuit in a latter-stage NIC at the time of inter-NIC transfer.

Next, skipping of the search circuit 36c in the latter-stage NIC 2a at the time of the inter-NIC transfer will be described. FIG. 5 is a diagram for describing skipping of the search circuit 36c in the latter-stage NIC 2a at the time of the inter-NIC transfer.

In FIG. 5, a virtual port reception processing circuit 32a is a circuit that performs reception processing of the virtual port processing circuit 32, and a virtual port transmission processing circuit 32b is a circuit that performs transmission processing of the virtual port processing circuit 32. An inter-NIC transfer reception circuit 35a is a circuit that performs reception processing of the inter-NIC transfer processing circuit 35, and an inter-NIC transfer transmission circuit 35b is a circuit that performs transmission processing of the inter-NIC transfer processing circuit 35.

A reception port #1 and a reception port #2 are the virtual ports 34 that receive packets. A reception port #3 is the physical port 37 that receives packets. A transmission port #1 and a transmission port #2 are the virtual ports 34 that transmit packets. A transmission port #3 is the physical port 37 that transmits packets. An external I/F 40 is an interface that communicates with the outside.

The information processing apparatus 1 has a virtual port number which is unique in the apparatus. In addition, when the inter-NIC transfer is performed, the input-side NIC 2a also serves as the reception destination of the output-side NIC 2a. As a result, as illustrated in FIG. 5, the inter-NIC transfer reception circuit 35a skips the search circuit 36c and delivers the packet received from the other NIC 2a directly to the crossbar switch 36e. Therefore, the latter-stage NIC 2a may process the packet at a high speed.

Figure 6:
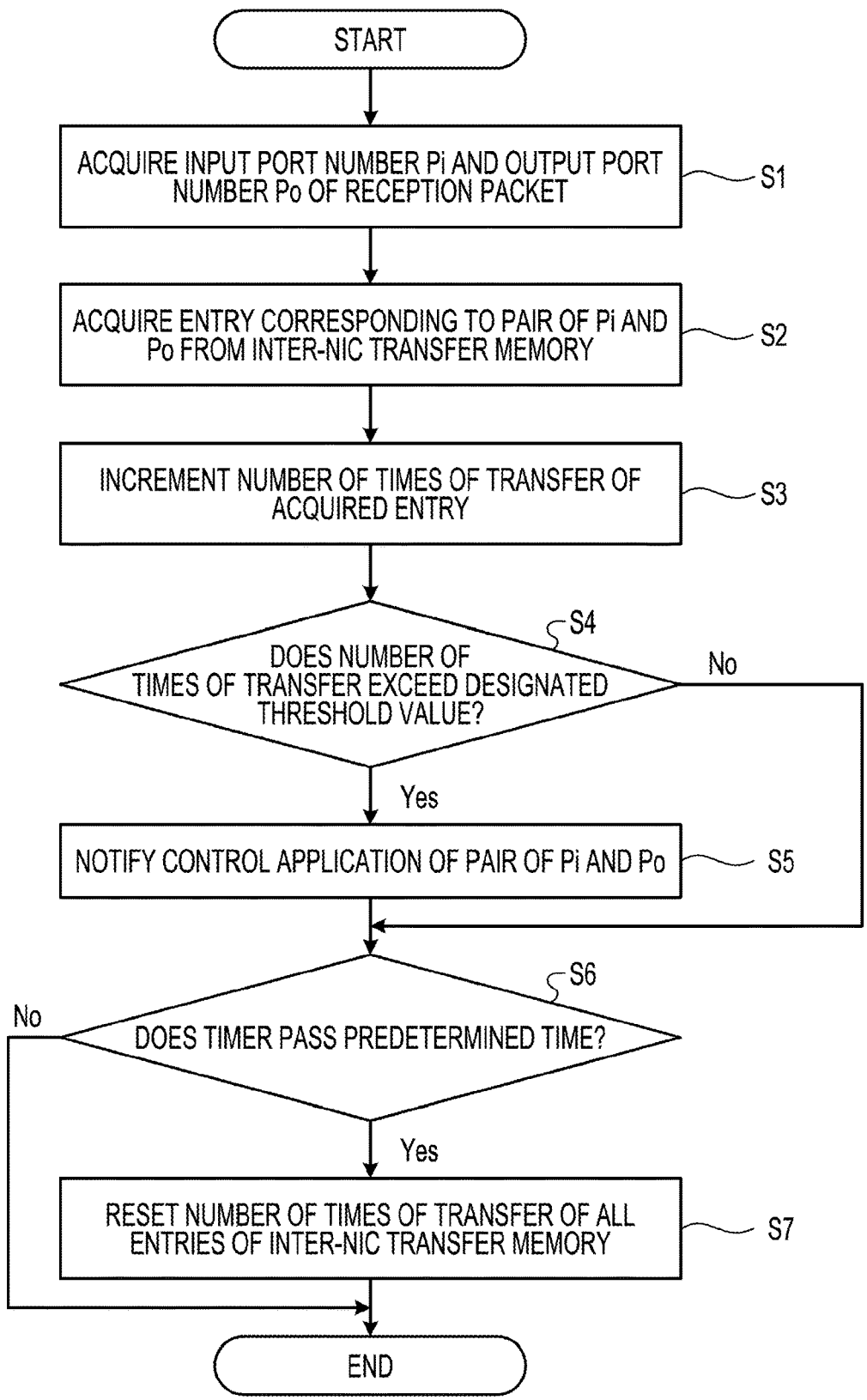
FIG. 6 is a flowchart illustrating a flow of a process of recording inter-NIC transfer.

Next, a flow of the process by the information processing apparatus 1 will be described with reference to FIGS. 6 to 9B. FIG. 6 is a flowchart illustrating a flow of a process of writing the inter-NIC transfer. As illustrated in FIG. 6, the inter-NIC transfer processing circuit 35 acquires an input port number Pi and an output port number Po of the reception packet (step S1). Here, the input port number Pi represents a number of the input virtual port 34, and the output port number Po represents a number of the output virtual port 34.

Then, the inter-NIC transfer processing circuit 35 acquires the entry corresponding to the pair of Pi and Po from the inter-NIC transfer memory 38 (step S2), and increments the number of times of the transfer of the acquired entry (step S3). Then, the inter-NIC transfer processing circuit 35 determines whether the number of times of the transfer exceeds a designated threshold value (step S4), and when it is determined that the number of times of the transfer exceeds the designated threshold value, the inter-NIC transfer processing circuit 35 notifies the control application of the pair of Pi and Po (step S5).

Then, the inter-NIC transfer processing circuit 35 determines whether a timer passes a predetermined time (step S6), and when it is determined that the timer passes the predetermined time, the inter-NIC transfer processing circuit 35 resets the number of times of transfer of all entries in the inter-NIC transfer memory 38 (step S7).

In this manner, since the inter-NIC transfer processing circuit 35 counts the number of times of the inter-NIC transfer for each pair of Pi and Po and notifies the control application of the pair of Pi and Po in which the number of times of the transfer exceeds the designated threshold value, the control application may perform the biasing of the virtual ports 34.

Figure 7:
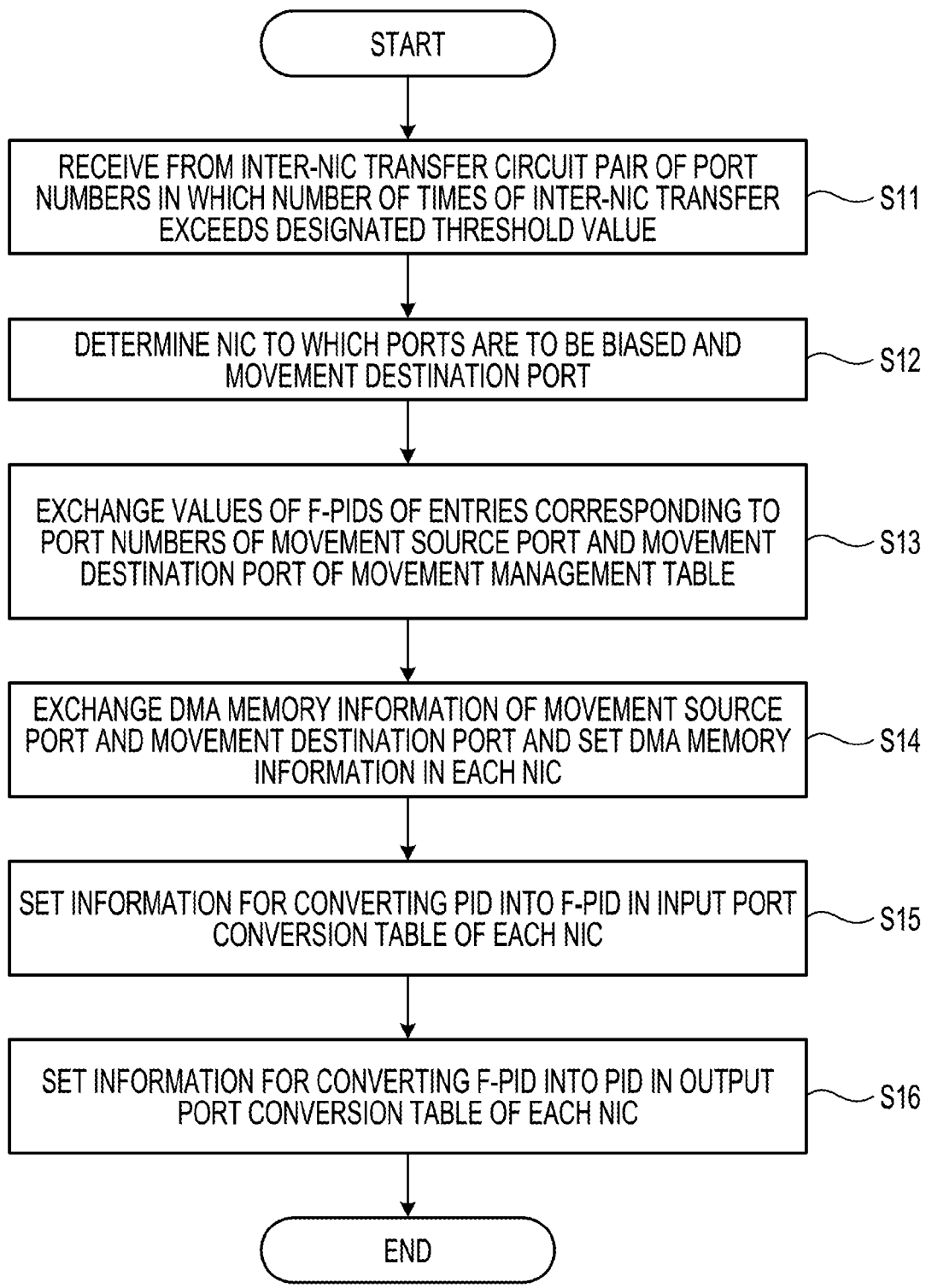
FIG. 7 is a flowchart illustrating a flow of a biasing process by a control application.

FIG. 7 is a flowchart illustrating a flow of a biasing process by a control application. As illustrated in FIG. 7, the control application receives, from the inter-NIC transfer processing circuit 35, a pair of port numbers in which the number of times of the inter-NIC transfer exceeds the designated threshold value (step S11). Then, the control application determines the NIC 2a to which the virtual ports are to be biased and a movement destination port, based on the received pair of port numbers (step S12). Here, the movement destination port is the virtual port 34 of a movement destination.

Then, the control application exchanges values of the F-PIDs of the entries corresponding to the port number of the movement source port and the movement destination port in the movement management table 21 (step S13). Here, the movement source port is the virtual port 34 of a movement source. Then, the control application exchanges the DMA memory information of the movement source port and the movement destination port and sets the exchanged DMA memory information in each NIC 2a (step S14).

Then, the control application sets the information for converting the PID into the F-PID in the input port conversion table of each NIC 2a for the PID whose value of F-PID is exchanged (step S15). In addition, the control application sets the information for converting the F-PID into the PID in the output port conversion table of each NIC 2a for the PID whose value of F-PID is exchanged (step S16).

In this manner, since the control application updates the movement management table 21, the DMA memory information table 33, and the port conversion table 36a, the relay circuit 36 may perform correct relay even when the virtual ports 34 are biased.

Figure 8:
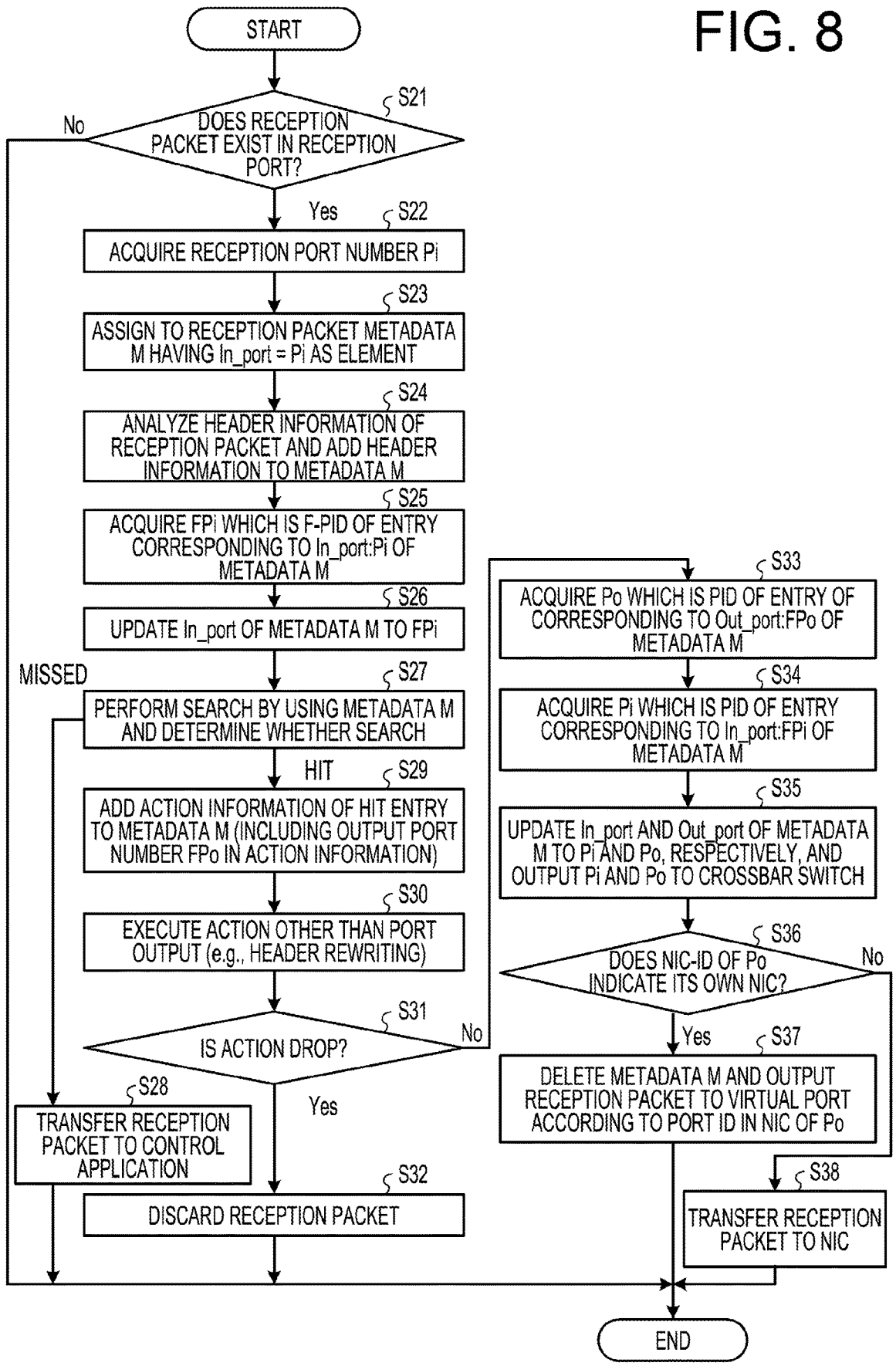
FIG. 8 is a flowchart illustrating a flow of a relay process.

FIG. 8 is a flowchart illustrating a flow of a relay process. As illustrated in FIG. 8, the NIC 2a determines whether there is the reception packet at the reception port (step S21), and when it is determined that there is no reception packet, the NIC 2a terminates the process. Here, the reception port is the virtual port 34.

Meanwhile, when it is determined that there is the reception packet at the reception port, the NIC 2a acquires the reception port number Pi (step S22) and assigns metadata M having In_port=Pi as an element to the reception packet (step S23). Here, In_port is a place indicating the reception port number in the metadata M. In addition, the processes in steps S21 to S23 are performed by the virtual port processing circuit 32.

Then, the NIC 2a analyzes the header information of the reception packet and adds the header information to the metadata M (step S24). Further, the process of step S24 is performed by the classification circuit 39. Then, the NIC 2a acquires FPi which is the F-PID (PID after conversion) of the entry corresponding to In_port:Pi of the metadata M from the input port conversion table (step S25), and updates the In_port of the metadata M to the FPi (step S26). In addition, the processes in steps S25 and S26 are performed by the input port number conversion circuit 36b.

Then, the NIC 2a performs a search using the metadata M and determines whether the search has hit (step S27). Then, when it is determined that the search is missed, the NIC 2a transfers the reception packet to the control application (step S28) and terminates the process. Meanwhile, when it is determined that the search has the hit, the NIC 2a adds the action information of the hit entry to the metadata M (step S29). Further, the action information includes an output port number FPo.

Then, the NIC 2a executes an action other than the port output included in the action information (step S30). The action includes, for example, rewriting the header information. In addition, the NIC 2a determines whether the action is a drop (step S31), and when it is determined that the action is the drop, the NIC 2a discards the reception packet (step S32) and terminates the process. Meanwhile, when it is determined that the action is not the drop, the NIC 2a proceeds to step S33. Further, the processes in steps S27 to S32 are performed by the search circuit 36c.

Then, the NIC 2a acquires Po which is the PID (PID after conversion) of the entry corresponding to Out_port:FPo of the metadata M from the output port conversion table (step S33). Then, the NIC 2a acquires Pi which is the PID (PID after conversion) of the entry corresponding to In_port:FPi of the metadata M from the output port conversion table (step S34). Then, the NIC 2a updates In_port and Out_port of the metadata M to Pi and Po, respectively, and outputs Pi and Po to the crossbar switch 36e (step S35). In addition, the processes in steps S33 to S35 are performed by the output port number conversion circuit 36d.

Then, the NIC 2a determines whether the NIC-ID of Po indicates its own NIC 2a (step S36), and when it is determined that the NIC-ID of Po indicates its own NIC 2a, the NIC 2a deletes the metadata M and outputs the reception packet to the virtual port 34 according to the port ID in the NIC of the Po (step S37). Meanwhile, when it is determined that the NIC-ID of Po does not indicate its own NIC 2a, the NIC 2a transfers the reception packet to the NIC 2a specified by the NIC-ID (step S38). The process of step S36 is performed by the relay circuit 36, the process of step S37 is performed by the virtual port processing circuit 32, and the process of step S38 is performed by the inter-NIC transfer processing circuit 35.

In this way, the input port number conversion circuit 36b converts the reception port number, and the output port number conversion circuit 36d converts the output port number searched by the search circuit 3c. Therefore, even when the biasing of the virtual ports 34 is performed, the NIC 2a may correctly relay the packet without changing the rule of the search circuit 3c.

Figure 9A:
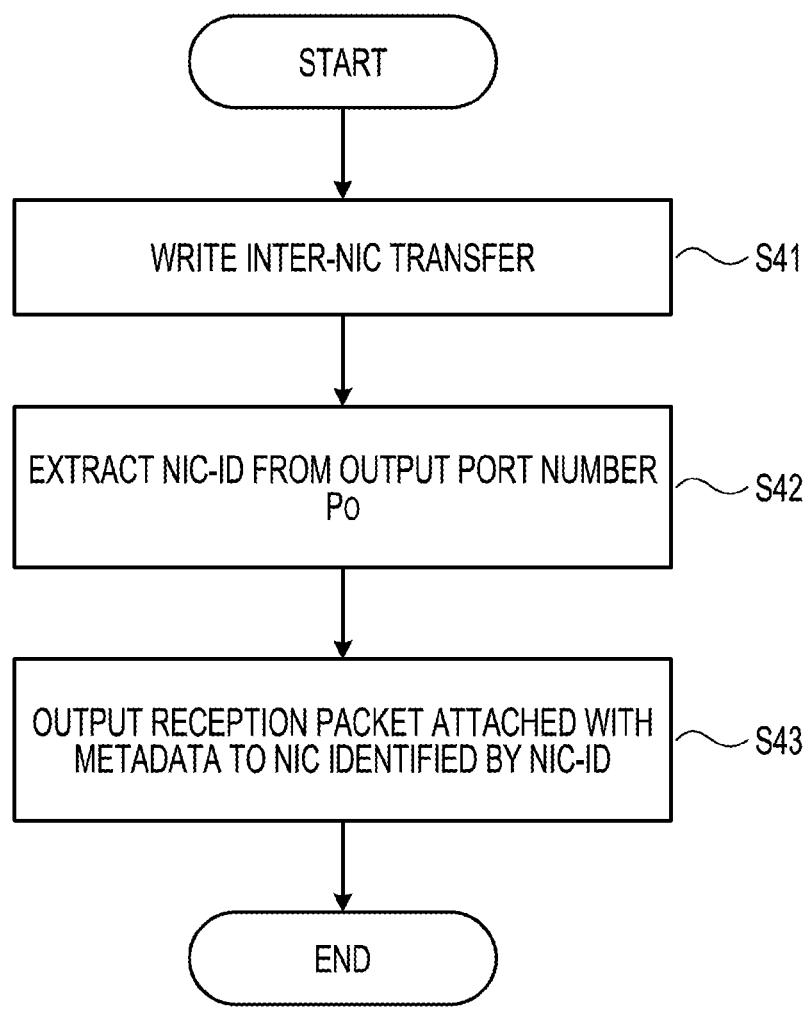
FIG. 9A is a flowchart illustrating a flow of an inter-NIC transfer process at an input side.

FIG. 9A is a flowchart illustrating a flow of an inter-NIC transfer process at an input side. As illustrated in FIG. 9A, the inter-NIC transfer processing circuit 35 at the input side writes the inter-NIC transfer (step S42). Then, the inter-NIC transfer processing circuit 35 at the input side extracts the NIC-ID from the output port number Po (step S42), and outputs the reception packet with metadata attached to the NIC 2a identified by the NIC-ID (step S43).

In this way, the inter-NIC transfer processing circuit 35 at the input side may determine whether the inter-NIC 2a transfer is frequently performed, by writing the inter-NIC transfer.

Figure 9B:
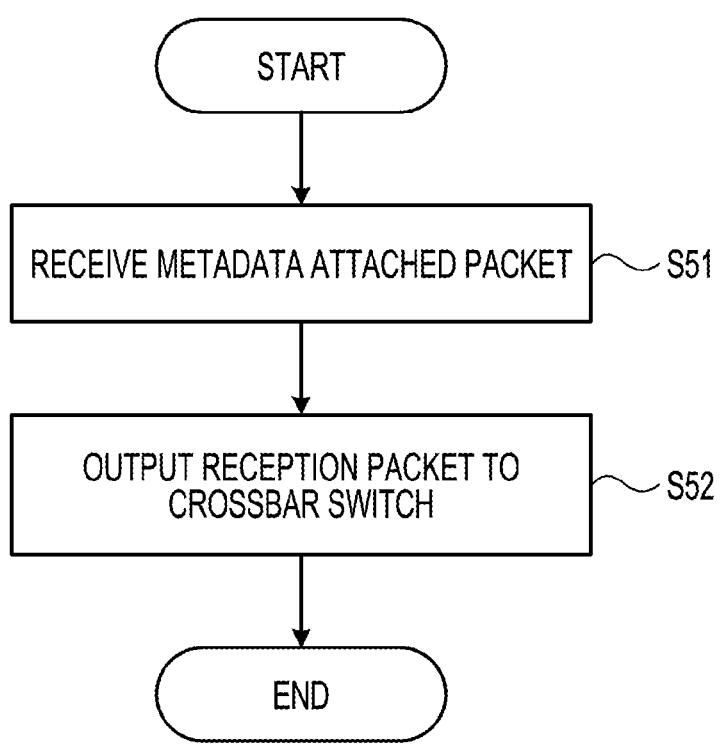
FIG. 9B is a flowchart illustrating a flow of an inter-NIC transfer process at an output side.

FIG. 9B is a flowchart illustrating a flow of an inter-NIC transfer process at an output side. As illustrated in FIG. 9B, the inter-NIC transfer processing circuit 35 at the output side receives the metadata-attached packet (step S51) and outputs the reception packet to the crossbar switch 36e (step S52).

The reception packet output to the crossbar switch 36e is transferred to the virtual port processing circuit 32, and the virtual port processing circuit 32 deletes the metadata M and outputs the reception packet from which the metadata has been deleted to the virtual port 34 according to the port ID in the NIC of the Po.

In this way, in the inter-NIC transfer, since the inter-NIC transfer processing circuit 35 at the output side outputs the reception packet to the crossbar switch 36e, the relay circuit 36 at the output side may skip the search circuit 36c, thereby relaying the packet at the high speed.

Figure 10:
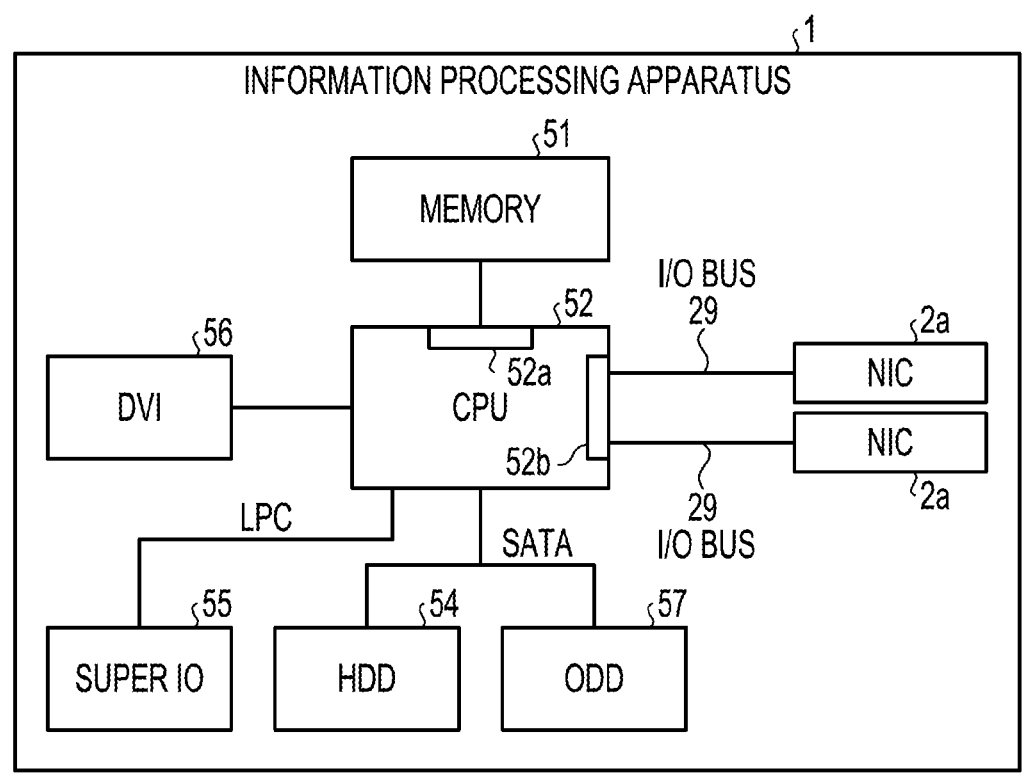
FIG. 10 is a diagram illustrating a configuration of an information processing apparatus which focuses on executing a control application.

Although the configuration of the information processing apparatus 1 has been described focusing on the configuration of the NIC 2a in FIG. 1, the virtual switch control circuit 2b in FIG. 1 is implemented by executing the control application in the CPU. Therefore, the configuration of the information processing apparatus 1 will be described focusing on executing the control application. FIG. 10 is a diagram illustrating the configuration of the information processing apparatus 1 focusing on executing the control application.

As illustrated in FIG. 10, the information processing apparatus 1 includes a memory 51, a CPU 52, and two NICs 2a. Further, the information processing apparatus 1 includes a hard disk drive (HDD) 54, a super input output (IC)) 55, a digital visual interface (DVI) 56, and an optical disk drive (ODD) 57.

The memory 51 is a random access memory (RAM) that stores, for example, a program or a result during an execution of the program. The CPU 52 is a central processing unit that reads and executes the program from the memory 51. The CPU 52 includes a memory controller 52a and an I/O controller 52b.

The HDD 54 is a disk device that stores the program or data, and the super IO 55 is an interface for connecting an input device such as a mouse or keyboard. The DVI 56 is an interface for connecting a liquid crystal display device, and the ODD 57 is a device that writes and reads a DVD.

The NIC 2a is connected to the CPU 52 via the I/O bus 29, and the HDD 54 and the ODD 57 are connected to the CPU 52 by serial advanced technology attachment (SATA). The super IO 55 is connected to the CPU 52 by low pin count (LPC).

The control application executed in the information processing apparatus 1 is stored in a DVD which is an example of a recording medium readable by the information processing apparatus 1, read from the DVD by the ODD 57, and installed in the information processing apparatus 1. Alternatively, the control application is stored in, for example, a database of another information processing apparatus connected via the NIC 2a, read from the databases, and installed in the information processing apparatus 1. In addition, the installed control application is stored in the HDD 54, read by the memory 51, and executed by the CPU 52.

In FIG. 10, the information processing apparatus 1 has one CPU 52. However, the information processing apparatus 1 may have a plurality of CPUs 52. As the information processing apparatus 1 having the plurality of CPUs 52, for example, there is an information processing apparatus 1 having a non-uniform memory access (NUMA) configuration.

Figure 11:
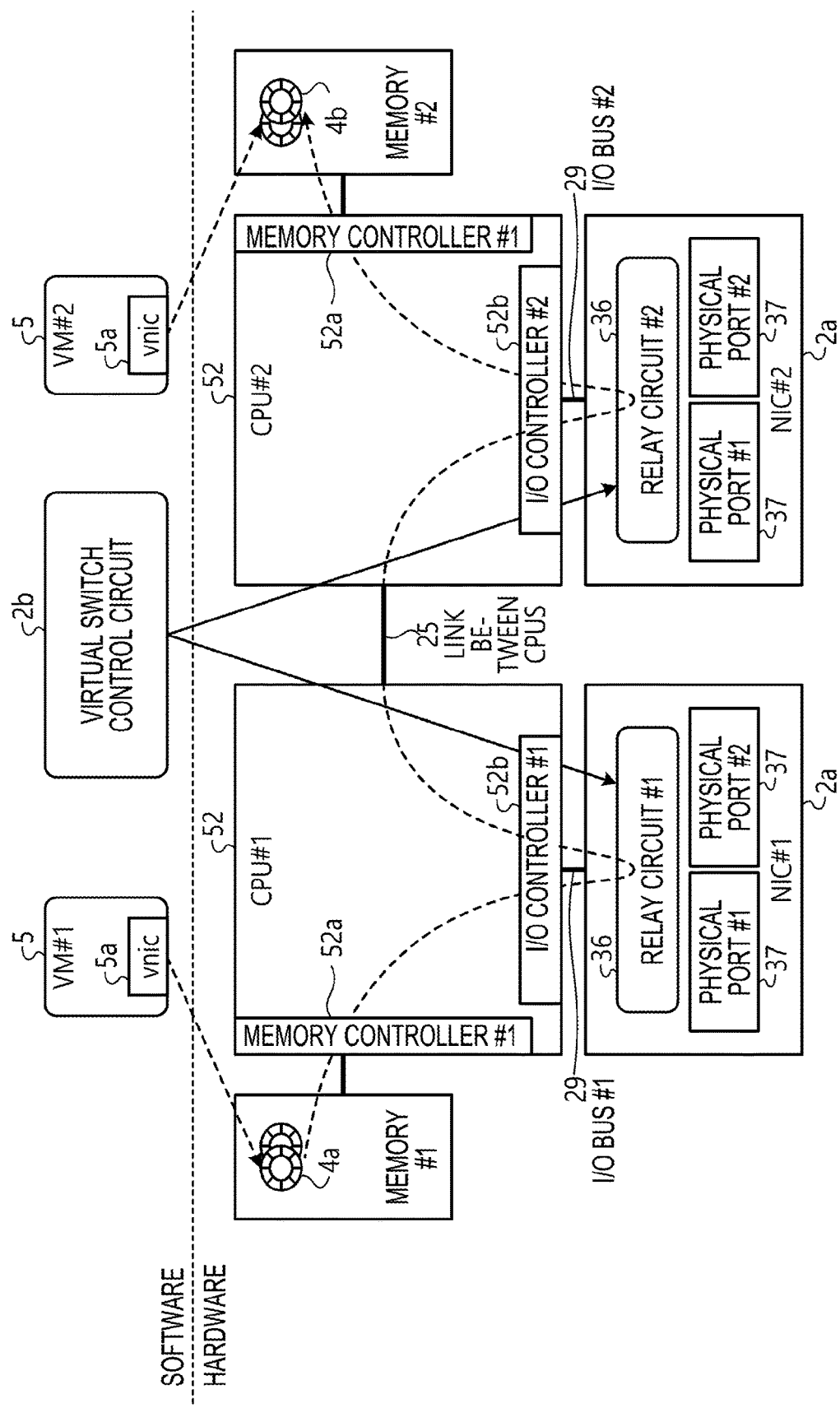
FIG. 11 is a diagram for describing biasing of a virtual port in an information processing apparatus of a NUMA configuration.

FIG. 11 is a diagram for describing the biasing of the virtual ports 34 in the information processing apparatus 1 of the NUMA configuration. In FIG. 11, the information processing apparatus 1 includes two CPUs 52 represented by a CPU #1 and a CPU #2. The CPU #1 is connected to a memory 4 represented by a memory #1 and a NIC 2a represented by a NIC #1, and the CPU #2 is connected to a memory 4 represented by a memory #2 and a NIC 2a represented by a NIC #2. The CPU #1 and the CPU #2 are connected to each other via an inter-CPU link 25.

The CPU #1 includes the memory controller 52a represented by the memory controller #1 and the I/O controller 52b represented by the I/O controller #1. The CPU #2 includes the memory controller 52a represented by the memory controller #2 and the I/O controller 52b represented by the I/O controller #2. The CPU #1 and the NIC #1 are connected to each other by the I/O bus 29 represented by the I/O bus #1, and the CPU #2 and the NIC #2 are connected to each other by the I/O bus 29 represented by the I/O bus #2.

In the NIC #1, the relay circuit 36 represented by the relay circuit #1 operates, and in the NIC #2, the relay circuit 36 represented by the relay circuit #2 operates. The VM #1 operates in the CPU #1, and the VM #2 operates in the CPU #2. The ring buffer 4a used by the VM #1 is secured in the memory #1, and the ring buffer 4b used by the VM #2 is secured in the memory #2. The vnic 5a of the VM #1 is connected to the relay circuit #1, and the vnic 5a of the VM #2 is connected to the relay circuit #2.

The VM #1 writes data to be transmitted to the ring buffer 4a of the memory #1. The data written to the ring buffer 4a is read by the relay circuit #1 via the memory controller #1, the I/O controller #1, and the I/O bus #1.

The relay circuit #1 transfers the data to the relay circuit #2 via the I/O bus #1, the I/O controller #1, the inter-CPU link 25, the I/O controller #2, and I/O bus #2. In addition, the relay circuit #2 writes the data to the ring buffer 4b via the I/O bus #2, the I/O controller #2, and the memory controller #2. In addition, the VM #2 reads the data from the ring buffer 4b.

As described above, in the information processing apparatus 1 having the NUMA configuration, a plurality of returns occurs on the I/O bus 29, as in the case where a single CPU 52 exists. Therefore, the waste of the I/O bus band may be prevented by biasing the virtual ports 34 connected to the VM #1 and the VM #2 to any one relay circuit 36.

An information processing system having a plurality of information processing apparatuses including the CPU 52, the memory 4, and the NIC 2a also prevents the waste of the I/O bus band by biasing the virtual ports 34 to which the VMs 5 operating on different CPUs 52 are connected, respectively.

As described above, in the embodiment, the PIDs before and after the biasing in the case where the virtual ports 34 are biased are associated with each other and stored in the input port conversion table and the output port conversion table. Then, the input port number conversion circuit 36b converts the PID of the input virtual port 34 after the biasing into the PID before the biasing by using the input port conversion table. Then, the search circuit 36c searches the rule using the PID converted by the input port number conversion circuit 36b, and specifies the PID of the output virtual port 34. Then, the output port number conversion circuit 36d converts the PID specified by the search circuit 36c into the PID after the biasing using the output port conversion table.

Therefore, the information processing apparatus 1 may bias the virtual ports 34 connected to the VM 5 to the same NIC 2a without changing the rule searched by the search circuit 36c, thereby preventing the waste of the I/O bus band. The biasing accompanies the setting of the port conversion table 36a, and the virtual switch control circuit 2b may set the port conversion table 36a in a relatively short time as compared with the change of many rules searched by the search circuit 36c.

In the embodiment, the inter-NIC transfer processing circuit 35 counts the number of times of the inter-NIC transfer for the pair of the input virtual port 34 and the output virtual port 34, and when the number of times of the inter-NIC transfer exceeds a designated threshold value, the inter-NIC transfer processing circuit 35 notifies the virtual switch control circuit 2b of the PIDs of the input virtual port 34 and the output virtual port 34. Then, the virtual switch control circuit 2b determines the NIC 2a to which the virtual ports are to be biased and the virtual port 34 of the movement destination, and updates the port conversion table 36a of each NIC 2a. Therefore, the NIC 2a may correctly convert the PID using the port conversion table 36a.

In the embodiment, the virtual switch control circuit 2b manages the movement (exchange) of the virtual ports 34 by using the movement management table 21, and updates the port conversion table 36a based on the movement management table 21. Therefore, even when the movement (exchange) of the virtual ports 34 connected to the VMs 5 is performed a plurality of times, the virtual switch control circuit 2b may correctly update the port conversion table 36a.

In the embodiment, when the packet is received from another NIC 2a, the inter-NIC transfer processing circuit 35 skips the search circuit 36c and transfers the received packet to the crossbar switch 36e. Therefore, the search for the rule becomes unnecessary, so that the latter-stage NIC 2a may relay the packet at a high speed.

The information processing apparatus 1 having the plurality of CPUs 52 like the information processing apparatus 1 having the NUMA configuration also biases the virtual ports 34 to which the VMs 5 operating in different CPUs 52 are connected, respectively, thereby preventing the waste of the I/O bus band.

In the embodiment, it is described that that the NIC 2a assigns the metadata to the packet received by the input virtual port 34 and converts the virtual port number included in the metadata. However, the NIC 2a may convert the virtual port number without using the metadata.

In the embodiment, it is described that the port conversion table 36a has the input port conversion table and the output port conversion table. However, the input port number conversion circuit 36b may have the input port conversion table, and the output port number conversion circuit 36d may have the output port conversion table.

In the embodiment, it is described that the port conversion table 36a has the input port conversion table and the output port conversion table. However, the port conversion table 36a may have only the output port conversion table.

In the embodiment, it is described that the relay circuit 62 of the virtual switch 6 is offloaded to the NIC 2a. However, the present disclosure may be similarly applied to a case of offloading the relay circuit 62 of the virtual switch 6 to an offload device such as another communication device.

When the NIC 2a has a processor and a RAM as in a smart NIC, a part of the configuration of the NIC 2a such as the relay circuit 36 illustrated in FIG. 1 may be implemented by a program executed by the processor. The program is stored in, for example, a nonvolatile storage device such as a read only memory (ROM) or a flash memory, and is read by the RAM. Then, the program is read from the RAM and executed by the processor.

All examples and conditional language recited herein are intended for pedagogical purposes to aid the reader in understanding the disclosure and the concepts contributed by the inventor to furthering the art, and are to be construed as being without limitation to such specifically recited examples and conditions, nor does the organization of such examples in the specification relate to a showing of the superiority and inferiority of the disclosure. Although the embodiment(s) of the present disclosure has (have) been described in detail, it should be understood that the various changes, substitutions, and alterations could be made hereto without departing from the spirit and scope of the disclosure.

What is claimed is:

1. An information processing apparatus comprising:
a plurality of offload devices configured to offload and execute a relay process of a virtual switch, each of the plurality of offload devices including:
a memory configured to store port conversion information, the port conversion information having a relationship with a first virtual port identifier and a second virtual port identifier, the first virtual port identifier identifying a first virtual port that is a virtual port before a virtual machine is moved between the offload devices for executing by the information processing apparatus, the second virtual port identifier identifying a second virtual port that is a virtual port after the virtual machine is moved between the offload devices for executing by the information processing apparatus, and
a processor coupled to the memory and configured to:
convert an input virtual port identifier for identifying an input virtual port into which a packet is input based on the port conversion information,
search an output virtual port identifier for identifying an output virtual port of the packet by using the converted input virtual port identifier,
convert the searched output virtual port identifier based on the port conversion information,
count the number of times of a transfer of a packet between the offload devices in association with a pair of the input virtual port identifier and the output virtual port identifier, and
determine an offload device to which the input virtual port and the output virtual ports are to be biased and a virtual port of a movement destination when the counted number of times of the transfer exceeds a predetermined threshold value, so as to update the port conversion information based on the virtual port of the movement destination.

2. The information processing apparatus according to claim 1, wherein the processor is configured to update the port conversion information by using movement management information which associates the virtual port identifier and a virtual port identifier to be used when searching the output virtual port identifier.

3. The information processing apparatus according to claim 1, wherein each of the plurality of offload devices further includes a crossbar switch configured to output the packet to the second output virtual port identified by the converted output virtual port identifier, and the processor configured to transfer a packet received from another offload device to the crossbar switch.

4. The information processing apparatus according to claim 1, further comprising a plurality of CPUs, wherein the port conversion information is configured to, when one of virtual ports to which a transmission-side virtual machine and a reception-side virtual machine executed by different CPUs are connected, respectively, is moved to the offload device having the other virtual port, associate the first virtual port identifier and the second virtual port identifier.

5. An information processing system comprising:

a plurality of information processing apparatuses, each of the plurality of information processing apparatuses including:

an offload device configured to offload and execute a relay process of a virtual switch, the offload device including:

a memory configured to store port conversion information, the port conversion information associating virtual port identifiers for identifying virtual ports before and after a virtual port to which a virtual machine executed by the information processing apparatus is connected is moved between the offload devices, and a processor coupled to the memory and configured to:
convert an input virtual port identifier for identifying an input virtual port into which a packet is input based on the port conversion information,
search an output virtual port identifier for identifying an output virtual port of the packet by using the converted input virtual port identifier, and
convert the searched output virtual port identifier based on the port conversion information, wherein any one processor is caused to execute a control program to determine an offload device to which the input virtual port and the output virtual ports are to be biased and a virtual port of a movement destination when the number of times of the transfer counted by the count circuit exceeds a predetermined threshold value, so as to update the port conversion information based on the virtual port of the movement destination.

6. A non-transitory computer-readable recording medium storing a program that causes a processor included in an information processing apparatus to execute a process, the process comprising:

storing port conversion information in a memory, the port conversion information having relationship with first virtual port identifier and second virtual port identifier, the first virtual port identifier identifying a first virtual port that is a virtual port before a virtual machine is moved between offload devices for executing by the information processing apparatus, the second virtual port identifier identifying a second virtual port that is a virtual port after the virtual machine is moved between the offload devices for executing by the information processing apparatus, converting an input virtual port identifier for identifying an input virtual port into which a packet is input based on the port conversion information, searching an output virtual port identifier for identifying an output virtual port of the packet by using the converted input virtual port identifier, converting the searched output virtual port identifier based on the port conversion information, counting the number of times of a transfer of a packet between the offload devices in association with a pair of the input virtual port identifier and the output virtual port identifier, and determining an offload device to which the input virtual port and the output virtual ports are to be biased and a virtual port of a movement destination when the counted number of times of the transfer exceeds a predetermined threshold value, so as to update the port conversion information based on the virtual port of the movement destination.

\* \* \* \* \*